United States Patent [19]

Sakurai et al.

[11] 4,417,775

[45] Nov. 29, 1983

[54] ELECTRICAL CONNECTOR DEVICE

[75] Inventors: Yoshimi Sakurai, Tanashi; Yoshimi Furukawa, Tokyo; Masaaki Kanai, Tokyo; Yasufumi Osada, Tokyo, all of Japan

[73] Assignees: Honda Giken Kogyo Kabushiki Kaisha; Furukawa Electric Co., Ltd., both of Tokyo, Japan

[21] Appl. No.: 323,716

[22] Filed: Nov. 23, 1981

[30] Foreign Application Priority Data

Nov. 26, 1980 [JP] Japan ................................. 55-166350
Apr. 13, 1981 [JP] Japan ................................. 56-55358

[51] Int. Cl.³ ............................................. H01R 39/02
[52] U.S. Cl. ..................................... 339/5 M; 339/3 S
[58] Field of Search ............... 339/2 L, 3 R, 3 S, 5 R, 339/5 M, 6 R, 8 R

[56] References Cited

U.S. PATENT DOCUMENTS

| 3,525,536 | 8/1970 | Pruneski | 339/3 S |
|---|---|---|---|
| 3,652,971 | 3/1972 | Bugg | 339/8 R |
| 3,763,455 | 10/1973 | Confer et al. | 339/3 S |
| 3,876,272 | 4/1975 | Tsutsumi et al. | 339/3 S |
| 4,063,789 | 12/1977 | Kreisl | 339/3 S |
| 4,157,854 | 6/1979 | Beauch | 339/3 S |

Primary Examiner—Eugene F. Desmond
Attorney, Agent, or Firm—Irving M. Weiner; Pamela S. Burt; John L. Shortley

[57] ABSTRACT

An electrical connector device comprises at least one first conductor fixed to a first insulator, at least one second conductor fixed to a second insulator which is angularly movable with respect to the first insulator, a third conductor in the form of a flexible wire which is disposed between the first and second insulators and which is at least partially loose, first and second contact members electrically connected to ends of the third conductor and to the first and second conductors, a third insulator angularly movable with respect to the first and second insulators, the second contact member being fixed to the third insulator, and a guide mechanism for guiding the second and third insulators to move angularly in the same direction. The electrical connector device allows desired rotation between relatively movable members in an electrical system while maintaining electrical connection therebetween by using the loosely disposed conductor.

17 Claims, 4 Drawing Figures

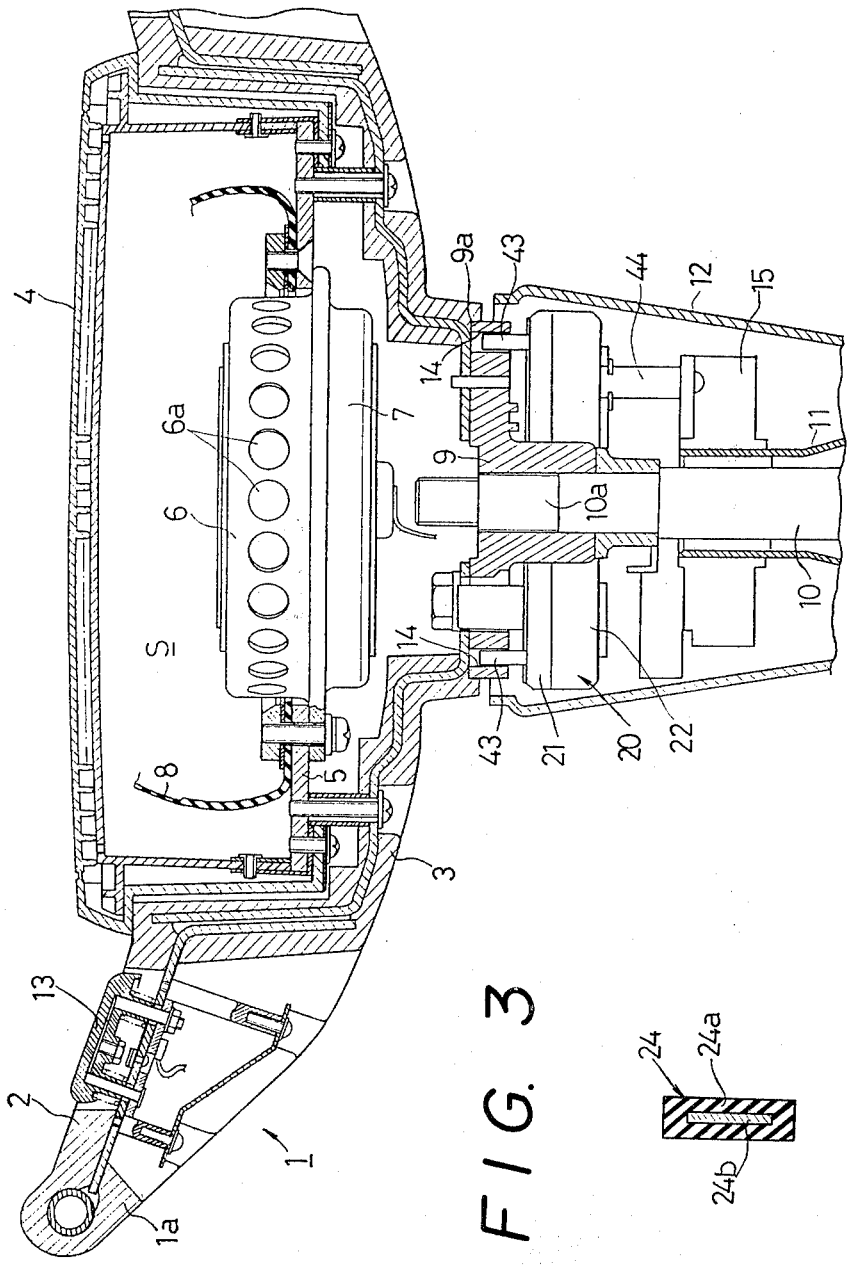
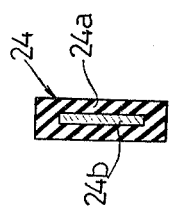

ELECTRICAL CONNECTOR DEVICE

BACKGROUND OF THE INVENTION

1. Field of the Invention

The present invention relates to an electrical connector device, and more particularly to an electrical connector device for an electrical system requiring electrical connection between rotatable members, such as an electrical system for an air bag system mounted in a steering wheel of a vehicle.

2. Description of the Prior Art

There have been known air bag systems which include an air bag normally collapsed to be housed in a steering wheel or another vehicular member and inflatable to provide cushioning against damaging impacts which passengers would otherwise be subjected to in automobile accident. Such air bag systems include a collision sensor which is attached to a vehicle frame and, upon detection of a vehicle collision requiring air bag inflation, delivers a signal to an actuator for detonating an explosive in order to release or produce a pressurized gas which, together with air, is introduced into the air bag to inflate the latter.

The air bag is normally housed centrally in the steering wheel with the actuator and gas generator disposed adjacent to the air bag, and the collision sensor is located remotely from the air bag. Because the steering wheel and steering shaft are rotatable with respect to the vehicle frame, the collision sensor and the actuator are required to be electrically connected to each other by a suitable electrical connector means which provides electrical connection between mutually rotatable members.

One such known connector means comprises a slip ring mechanism including a slip ring and a brush which are movable relative to each other and held in sliding contact with each other. While the slip ring mechanism allows the slip ring and brush to move angularly through a relatively large angle, contacts of the slip ring and brush tend to wear through repeated use, tend to fail to provide good electrical contact, and hence are unable to operate stably for a long period of time. A plurality of such slip ring mechanisms would be required to protect against malfunctioning of the air bag system. The known mechanism is also disadvantageous in that abrasive contact between the brush and the slip ring causes wearing thereof into metal powder which is liable to cause short-circuiting, the brush and slip ring generates noise signals which adversely affect a supplied pulse signal and hence invite malfunctioning of the air bag system, and there is a tendency to produce sparks between the brush and the slip ring. The connector device suffering from these difficulties is not considered optimum for use with the air bag system which is a most important safety device that is required to be absolutely reliable and stable in operation.

The present applicant has proposed an electrical connector device designed to eliminate the difficulties experienced with the slip ring connector mechanism, and comprising upper and lower casings and an electrical conductor in the form of a cord loosely spirally coiled between the upper and lower casings. One of the casings is coupled to a rotatable member such as a steering wheel and the other casing is coupled to a fixed member such as a steering column. When the rotatable member rotates, the electrical conductor is moved in the winding or unwinding direction while maintaining electrical connection between the rotatable and fixed members. Winding or unwinding movement of the coiled conductor, however, imposes a certain limitation on the extent of rotation of the steering wheel. The electrical conductor is limited in length due to a space available between the casings and a space surrounding the latter. In addition, the conductor should be assembled in position so that it is coiled in a neutral position, that is, it is not displaced in either the winding or unwinding direction when the steering wheel is not rotated. If the conductor were not coiled in its neutral position or pre-biased as assembled, it would cause the steering wheel to become sluggish when the latter is turned clockwise or counterclockwise, tensioning the conductor excessively. Assembling operation of such connector device is tedious and complex because the conductor needs to be checked for being coiled in the neutral position as assembled. There is always a tendency for the conductor to be assembled or coiled improperly since it is difficult to completely eliminate assembling errors.

The present invention effectively overcomes the foregoing problems of the prior connector devices.

SUMMARY OF THE INVENTION

It is an object of the present invention to provide an electrical connector device having a loosely coiled electrical conductor for allowing desired rotation between relatively rotatable members in an electrical system.

Another object of the present invention is to provide an electrical connector device including an angularly movable member which is automatically returnable to its neutral position.

Still another object of the present invention is to provide an electrical connector device which is simple in construction.

According to the present invention, there is provided an electrical connector device which comprises at least one first conductor fixed to a first insulator, at least one second conductor fixed to a second insulator which is angularly movable with respect to the first insulator, a third conductor in the form of a flexible wire which is disposed between the first and second insulators and which is at least partially loose, first and second contact members electrically connecting either end of the third conductor with the first and second conductors, a third insulator angularly movable with respect to the first and second insulators, the second contact member being fixed to the third insulator, and a guide mechanism for rendering the second and third insulators to move angularly in the same direction.

The guide mechanism includes a device for limiting relative angular movement between the first and third insulators within a predetermined angular interval.

The above and other objects, features and advantages of the present invention will become more apparent from the following description when taken in conjunction with the accompanying drawings in which preferred embodiments of the present invention are shown as illustrative examples.

BRIEF DESCRIPTION OF THE DRAWINGS

FIG. 1 is a fragmentary cross-sectional view of a steering wheel mechanism having an air bag system incorporating therein an electrical connector device according to a first embodiment of the present invention.

FIG. 3 is an enlarged transverse cross-sectional view of an electrical conductor employed in the electrical connector device of FIG. 1.

DETAILED DESCRIPTION

Figure 2:
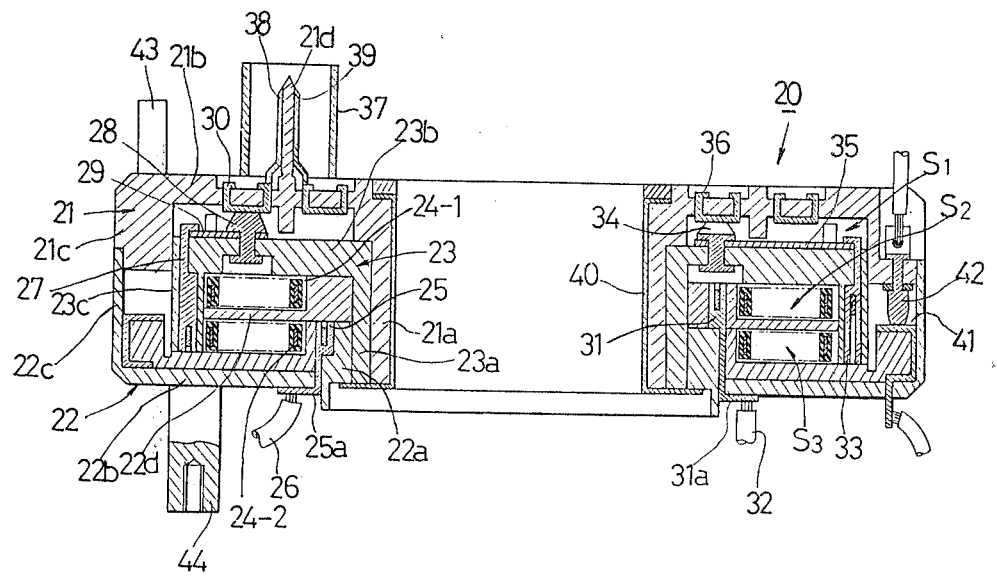
FIG. 2 is a cross-sectional view of the electrical connector device shown in FIG. 1.

FIGS. 1 through 3 illustrate an electrical connector device according to a first embodiment of the present invention.

A steering wheel 1 comprises an annular wheel member 1a connected by a plurality of radial spokes 2 to a central concave member 3 located radially inwardly of the annular wheel member 1a, the central concave member 3 being covered with a pad 4. A gas generator 6 having nozzles 6a is mounted centrally on a base 5 which is supported on a bottom of the central concave member 3 and disposed in a space S in the latter. The gas generator 6 may comprise a gas cylinder (not shown) which is releasable to discharge or produce pressurized gas by an actuator 7 disposed below the gas generator 6 in response to a signal supplied from a collision sensor (not illustrated) to the actuator 7. An air bag 8 in a collapsed condition is housed in the space S above the gas generator 6. Upon introduction of the gas into the air bag 8, the latter is inflated, tears off the pad 4, and expands in front of the driver to dampen the shock or impact which the driver would otherwise be subjected to during a traffic accident.

The steering wheel 1 also includes a boss 9 which is fixed at its center to an upper distal end 10a of a steering shaft 10. Rotational steering movement of the steering wheel 1 can thus be transmitted to the steering shaft 10 for steering the vehicle. The steering shaft 10 is surrounded by a steering column 11 which is fixed with respect to a vehicle frame. A cover 12 extends in surrounding relation to the steering shaft 10 and up to the central member 3 of the steering wheel 1. Horn switches 13 are supported on some of the spokes 2.

As shown in FIG. 2, an electrical connector device 20 comprises an upper casing 21 coupled for rotation with the steering wheel 1, a lower casing 22 fixed to the steering column 11, and an intermediate casing 23 disposed in a space $S_1$ defined between the upper and lower casings 21, 22, the intermediate casing 23 being rotatable relative to the upper and lower casings 21, 22. The upper casing 21 is integrally formed of an insulating material such as synthetic resin, and comprises a central cylindrical wall 21a, a disc-shaped member 21b extending radially outwardly from the central cylindrical wall 21a, and an outer annular wall 21c extending axially downwardly from an outer edge of the disc-shaped member 21b. The lower casing 22 is also integrally formed of an insulating material such as synthetic resin, and comprises an inner wall 22a, a disc-shaped bottom 22b, and an outer annular wall 22c extending axially upwardly from an outer edge of the disc-shaped bottom 22b. The lower casing 22 is rotatably fitted over a lower portion of the cylindrical wall 21a of the upper casing 21. Defined upwardly of the disc-shaped bottom 22b of the lower casing 22 is a pair of upper and lower spaces $S_2$, $S_3$ separated by a partition 22d and extending in spaced relation around the cylindrical wall 21a. A pair of coiled electrical conductors 24-1, 24-2 are disposed respectively in the spaces $S_2$, $S_3$. Each of the electrical conductors 24 comprises, as shown in FIG. 3, a flexible insulating body 24a, such as synthetic resin in the form of a tape, and a tape-shaped wire 24b of copper embedded in the flexible insulating body 24a. The electrical conductor 24 may instead be of a circular cross section. One of the electrical conductors is coiled so as to be loose in the lefthand direction in its neutral position as assembled, and the other electrical conductor is coiled so as to be loose in the righthand direction in its neutral position as assembled. The lengths of the coiled electrical conductors are such that they will allow the steering wheel to rotate through one and a half revolutions or more in the righthand or lefthand direction from the neutral position, as the electrical conductors are wound and unwound.

The intermediate casing 23 comprises a radially inward cylindrical wall 23a, a disc-shaped member 23b extending radially outwardly from an upper edge of the cylindrical wall 23a, and an annular outer wall 23c extending axially downwardly from an outer edge of the disc-shaped member 23b. The disc-shaped member 23b closes the upper space $S_2$. The cylindrical wall 23a is interposed between the cylindrical wall 21a of the upper casing 21 and the inner wall 22a of the lower casing 22. The outer wall 23c is located radially inwardly of the outer walls 21c, 22c of the upper and lower casings 21, 22, and serves to define the spaces $S_1$, $S_2$ radially outwardly.

The lower casing 22 has a terminal 25 embedded in a radially inward lower portion thereof and having an end 25a projecting out of the disc-shaped bottom 22b and connected to a connector cord 26, the terminal 25 also being connected through its embedded portion to an inner end of the lower electrical conductor 24-2. The lower electrical conductor 24-2 has an outer end connected to a lower portion of a terminal 27 embedded in the outer wall 23c of the intermediate casing 23 and connected through a terminal plate 29 to a slip ring blade terminal 28 disposed on and projecting from a relatively radially outward region of the disc-shaped member 23b of the intermediate casing 23. The disc-shaped member 21b of the upper casing 21 supports a slip ring 30 extending in alignment with the path of circular motion of the blade terminal 28, the slip ring 30 and the blade terminal 28 being pressed against each other to allow the upper casing 21 and the intermediate casing 23 to rotate in unison.

A terminal 31 is embedded in the lower casing 22 at a radially inward portion thereof and has an end 31a connected to a connector cord 32. The terminal 31 is also connected to an inner end of the upper electrical conductor 24-1, the outer end of which is connected to a terminal 33 embedded in the outer wall 23c of the intermediate casing 23 remotely from the terminal 27. The terminal 33 is connected through a terminal plate 35 to a slip ring blade terminal 34 disposed on and projecting from a relatively radially inward portion of the disc-shaped member 23b of the intermediate casing 23. The blade terminal 34 is pressed against a slip ring 36 mounted on the disc-shaped member 21b of the upper casing 21 and spaced radially inwardly from the slip ring 30.

The disc-shaped member 21b of the upper casing 21 supports thereon a connector 37 axially aligned with the rings 30, 36 and having disposed centrally therein a guide projection 21d projecting from the disc-shaped member 21b. A pair of terminal members 38, 39 which are insulated from each other are attached to the guide projection 21d and connected respectively to the slip rings 30, 36, the terminal members 38, 39 being connected to an electrical circuit for the air bag system on the steering wheel 1.

The upper, intermediate, and lower casings 21, 22, 23 are assembled together by a holder ring 40. The outer walls 21c, 22c of the upper and lower casings 21, 22 support thereon a terminal 42 and a slip ring 41, respectively, which constitute an electrical circuit for the horn switches 13.

The electrical connector device 20 thus constructed is fitted over the boss 9 of the steering wheel 1 with the holder ring 40 extending around the boss 9. As assembled, the upper casing 21 has an upwardly projecting engagement pin 43 inserted in a hole 14 in a flange 9a of the boss 9, and the lower casing 22 has a downwardly projecting engagement pin 44 fastened to a boss 15 secured to the steering column 11. Thus, the upper casing 21 is rotatable in unison with the steering wheel 1, whereas the lower casing 22 is fixed to the steering column 11 and held nonrotatable.

Operation of the electrical connector device 20 is as follows: The upper and intermediate casings 21, 23 are connected together by the terminals 28, 34 held respectively against the slip rings 30, 36. As the steering wheel 1 rotates, the upper casing 21 and hence the intermediate casing 23 are caused to rotate in unison therewith. During such rotation, one of the electrical conductors 24-1, 24-2 is wound and the other electrical conductor is unwound. The electrical circuit for the air bag system is defined by a forward electrical path comprising the connector cord 26, the terminal 25, the conductor 24-2, the terminal 27, the terminal plate 29, the terminal 28, the slip ring 30 and the terminal 38; and a return electrical path comprising the terminal 39, the ring 36, the terminal 34, the terminal plate 35, the terminal 33, the conductor 24-1, the terminal 31 and the connector cord 32, the terminals 28, 34 serving as fixed contacts pressed against the rings 30, 36, respectively, against sliding movement. Thus, there are no contacts which are held in sliding contact with one another that would otherwise be the case with a slip ring mechanism. With the fixed contacts employed, the conductor device of the present invention does not suffer from the disadvantages attendant the conventional slip ring mechanism due to sliding engagement between contacts.

The electrical conductors 24-1, 24-2 are arranged respectively for righthand and lefthand rotations, and should be properly assembled so as to be coiled in their neutral positions. If the conductors are assembled as shifted out of their neutral positions, one of the electrical conductors is short of its length in its rotation, with the result that the electrical conductor would be excessively tensioned at its limit of rotation, rendering the steering wheel sluggish in its turning motion and imposing undue stresses on the associated terminals. With the electrical conductors overly tensioned, the blade terminals 28, 34 are caused to slide frictionally on the rings 30, 36, upon rotation of the steering wheel 1, thus angularly moving the intermediate casing 23 relative to the upper casing 21 through a given angle toward the desired neutral position. As the tensioning load on the electrical conductors becomes smaller than the force with which the terminals 28, 34 are pressed against the rings 30, 36, respectively, the upper and intermediate casings 21, 23 are rendered immovable with respect to each other. Thus, assembling errors are automatically corrected while the steering wheel 1 rotates, and the electrical conductors 24-1, 24-2 are neutrally positioned. The terminals 28, 34 and the rings 30, 36 are frictionally movable relative to each other only when the electrical conductors are to be corrected with respect to the positions thereof. After the electrical conductors have been corrected in their positions, the contacts are immovable with respect to each other for electrical connection only through fixed contacts.

The electrical connector device of the present invention is thus automatically correctable to its neutral position, eliminating assembling errors while the steering wheel is rotated. Therefore, no precise detection of the neutral position and hence no stringent procedure is necessary when the electrical connector device is assembled. The electrical connector device can easily be assembled, and does not need to be disassembled and assembled again even if it is assembled erroneously. Steering movement of the steering wheel 1 is not adversely affected by assembling errors present in the electrical connector device 20. Electrical connection between the relatively movable members is provided by the electrical conductors through the fixed contacts, and hence is reliable and stable. The electrical connector device is highly suitable for use with air bag systems, and is relatively simple in construction and inexpensive to manufacture since it only requires the intermediate casing, the blade terminals and the associated rings to be added to the above-mentioned electrical connector device which the applicant has previously proposed.

While the electrical connector device according to the invention has been shown and described as incorporated in an air bag system on a steering wheel, the electrical connector device can be used in a variety of applications as connectors for relatively rotatable devices.

Figure 4:
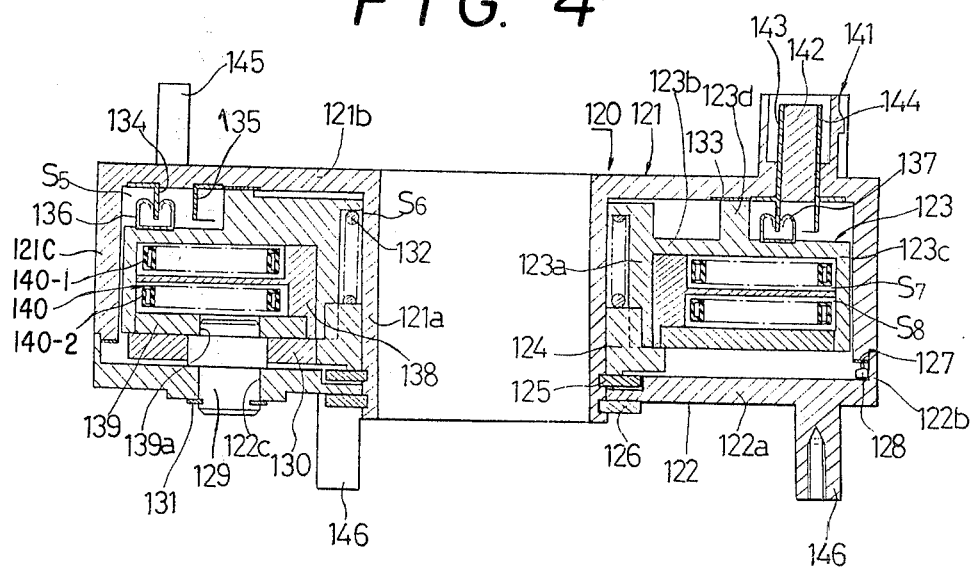
FIG. 4 is a cross-sectional view of an electrical connector device according to a second embodiment of the present invention.

An electrical connector device according to a second embodiment will be described with reference to FIG. 4.

An electrical connector device 120 comprises an upper rotatable casing 121, a lower fixed casing 122, and an intermediate casing 123 disposed in a space $S_5$ defined between the upper and lower casings 121, 122, the intermediate casing 123 being rotatable with respect to the upper and lower casings 121, 122. The upper casing 121 has a central cylindrical wall 121a supporting thereon a large-diameter gear 124 held in position by a snap ring 125 and loosely fitted on a lower portion of the cylindrical wall 121a for free rotation around the upper casing 121. The upper casing 121 also includes a disc-shaped member 121b extending radially outwardly from an upper end of the cylindrical wall 121a, and an outer annular wall 121c extending axially downwardly from an outer edge of the disc-shaped member 121b. The upper casing 120 is formed integrally of an insulating material such as synthetic resin. The lower casing 122 is also formed integrally of an insulating material such as synthetic resin, and comprises a horizontal disc-shaped member 122a and an outer annular wall 122b extending axially upwardly from an outer periphery of the disc-shaped member 122a. The lower casing 122 is loosely fitted at its center over the cylindrical wall 121a of the upper casing 121, and is held in position thereon by a snap ring 126 so that the outer annular wall 122b engages a lower edge of the outer annular wall 121c of the upper casing 121. The outer annular wall 121c of the upper casing 121 has a lower circumferential edge made of a conductive metal, to which there is attached a ring terminal 127 connected to alarm horn switches (not shown). The lower casing 122 supports thereon a brush 128 connected to a non-illustrated power supply and resiliently held against the ring terminal 127.

The horizontal disc-shaped member 122a of the lower casing 122 has a through hole 122c through which vertically extends a gear shaft 129 having one end received in a through hole 139a in a partition 139 (described later), the gear shaft 129 being freely rotatable in the holes 122c, 139a. A small-diameter gear 130 is fitted over a central portion of the gear shaft 129 and held in mesh with the large-diameter gear 124. The gear shaft 129 is prevented from moving axially by a split pin 131.

The large-diameter and small-diameter gears 124, 130 jointly serve as a rotation locking mechanism for mechanically limiting rotation of the intermediate casing 123 in opposite directions, and are held in a specially designed meshing relation to each other. More specifically, the small-diameter gear 130 has teeth defined by combining adjacent two kinds of teeth, and the large-diameter gear 124 has a plurality of gear grooves which allow meshing engagement only with the teeth of the small-diameter gear 130 and are positioned at predetermined locations such that the intermediate casing 123 can be locked with respect to the lower casing 122 after the former has rotated relative to the latter through a predetermined number of revolutions in either direction. The gears 124, 130 are made of the same material at that from which the upper and lower casings 121, 122 are made.

The intermediate casing 123 is similarly formed integrally of an insulating material such as synthetic resin, and comprises an inner annular wall 123a, an annular disc-shaped member 123b, and an outer annular wall 123c. The inner annular wall 123a is coupled at a lower end portion thereof with the large-diameter gear 124 through axial splines to allow corotation and relative axial movement between the intermediate casing 123 and the large-diameter gear 124. The intermediate casing 123 is resiliently urged upwardly by a coil spring 132 placed under compression in an annular space $S_6$ defined between the inner wall 123a of the intermediate wall 123 and the cylindrical wall 121a of the upper casing 121. The annular disc-shaped member 123b of the intermediate casing 123 has an annular projection 123d extending upwardly and pressed against an annular friction plate 133 disposed in a lower surface of the disc-shaped member 121b of the upper casing 121. The frictional force with which the annular projection 123d is held against the annular friction plate 133 enables the intermediate casing 123 to normally rotate with the upper casing 121 except when correcting assembling errors.

The disc-shaped member 121b of the upper casing 121 supports on its radially outward peripheral surface a pair of slip rings 134, 135 made of a conductive metal in the form of annular fins having different diameters. The disc-shaped member 123b of the intermediate casing 123 supports thereon resilient contact terminals 136, 137 of a conductive metal located respectively in alignment with the annular slip rings 134, 135. The resilient contact terminals 136, 137 resiliently grip the slip rings 134, 135, respectively, at their vertically central portions. The contact terminals 136, 137 and the slip rings 134, 135 jointly constitute a slip ring mechanism. Although not shown, the slip rings 134, 135 may be mounted on the intermediate casing 123, and the contact terminals 136, 137 may be fixed to the upper casing 121. As a further alternative, the slip ring mechanism may be disposed between the outer wall 123c of the intermediate casing 123 and the outer wall 121c of the upper casing 121.

Between the intermediate and lower casings 123, 122, there are defined upper and lower annular spaces $S_7$, $S_8$ by partitions 138, 139, in which upper and lower electrical conductors 140-1, 140-2 are coiled and which comprise tape-like elongated members constructed as shown in FIG. 3. One of the electrical conductors is coiled so as to be loose in a left-hand direction at its neutral position as assembled, and the other electrical conductor is coiled so as to be loose in a righthand direction at its neutral position as assembled. The electrical conductors 140-1, 140-2 are of such a length that they will allow the steering wheel to rotate from its neutral position through one and one half revolutions or more in either direction.

The electrical conductors 140-1, 140-2 have the inner ends thereof electrically connected to a collision sensor (not shown), and the outer ends thereof connected to the slip ring mechanism.

The disc-shaped member 121b of the upper casing 121 supports thereon a connector 141 projecting upwardly therefrom in alignment with the slip rings 134, 135 and having a central guide projection 142. A pair of terminal members 143, 144 which are insulated from each other are connected respectively to the slip rings 135, 134 and to an electrical circuit for an air bag system on a steering wheel (not shown).

Although not shown, the inner cylindrical wall 121a is fitted over a boss of the steering wheel with engagement pins 145 on the upper casing 121 being inserted in holes in a flange of the boss and with engagement pins 146 on the lower casing 122 being fastened to a boss attached to a steering column (not shown). Thus, the upper casing 121 is rotatable with the steering wheel, and the lower casing 122 is immovably fixed to the steering column.

The electrical connector device 120 thus constructed will operate as follows: The upper and intermediate casings 121, 123 are normally rotatable in unison since the projection 123d is pressed against the friction plate 133. As the steering wheel rotates in one direction, the upper and the intermediate casings 121, 123 rotate therewith in the same direction, whereupon one of the electrical conductors 140-1, 140-2 between the intermediate and lower casings 123, 122 is wound, whereas the other electrical conductor is unwound. At this time, the slip rings 134, 135 and the contact terminals 136, 137 corotate without relative slippage therebetween. Thus, the slip ring mechanism functions as fixed contacts with permit reliable electrical connection between the relatively rotatable members. Because the slip rings 134, 135 are resiliently gripped by the contact terminals 136, 137, they are reliably electrically connected regardless of any relative vertical displacement between the intermediate and upper casings 123, 121.

There are sometimes occasions where the electrical conductors 140-1, 140-2 are coiled and assembled as they are shifted out of neutral position, and will impose undue loads on the steering wheel and also excessive stresses on associated terminals when the steering wheel is rotated. To cope with this problem, the rotation locking mechanism will be actuated to prevent the large-diameter gear 124 and hence the intermediate casing 123 from being further rotated before one of the electrical conductors 140-1, 140-2 is put under excessive tension due to errors made when the electrical conductors are assembled. The upper casing 121, however, is caused to rotate with the steering wheel as the upper casing 121 overcomes frictional resistance imposed by the intermediate casing 123. The upper casing 121 is thus angularly moved relative to the intermediate casing 123 as locked toward the neutral position through a certain angle. After the upper casing 121 has been brought to the neutral position with respect to the intermediate casing 123, they are again rendered immovable relative to each other for corotation. The assembling errors are now automatically corrected by the relative slippage between the upper casing 121 and the intermediate casing 123. Such relative slippage takes place only when correcting assembling errors of the electrical conductors 140-1, 140-2. After the assembling errors have been corrected, or the electrical conductors have been properly coiled, the upper and intermediate casings 121, 123 are again rendered corotatable by frictional resistance produced between the casings 121, 123 under the resilient force of the coil spring 132. The slip ring mechanism thus serves only as fixed contacts for reliable electrical connection.

While the electrical connector device according to the second embodiment has been described as combined with an air bag system on a steering wheel, the electrical connector device of the second embodiment may also be used in other devices having relatively rotatable members which are to be electrically interconnected.

With the foregoing arrangement, the intermediate casing is pressed against the upper casing by the resilient means such as a spring, and the rotatable and fixed members are electrically connected through the slip ring mechanism. The intermediate and lower casings are normally corotatable with the slip ring mechanism serving merely as fixed contacts except when assembling errors are to be corrected. Thus, the electrical connector device can provide dependable electrical connection, and will operate reliably and stably for a long period of time.

When assembling errors of the electrical conductors are to be corrected, the rotation locking mechanism is actuated to lock the intermediate casing against rotation and, thereafter, the upper casing is caused by the steering wheel to slip angularly with respect to the intermediate casing toward the neutral position through a certain angle. Thus, the electrical connector device can automatically be corrected to eliminate the assembling errors by being brought to the neutral position. No precise detection of the neutral position and hence no stringent procedure is necessary when the electrical connector device is assembled. The electrical connector device of the second embodiment can easily be assembled, and does not need to be disassembled and assembled again even if it is assembled erroneously. Further, steering movement of the steering wheel is not adversely affected by assembling errors which the electrical connector device may have when assembled.

Although some preferred embodiments have been shown and described in detail, it should be understood that various changes and modifications may be made therein without departing from the scope of the appended claims.

What is claimed is:

1. An electrical connector device comprising a first insulator, at least one first conductor fixed to said first insulator, a second insulator angularly movable with respect to said first insulator, at least one second conductor fixed to said second insulator, a third conductor in the form of a flexible wire which is disposed between said first and second insulators and which is at least partially loose, first and second contact means electrically connecting either end of said third conductor with said first and second conductors, respectively, a third insulator angularly movable with respect to said first and second insulators, said second contact means being fixed to said third insulator, and a guide mechanism for rendering said second and third insulators to move angularly in the same direction.

2. An electrical connector device according to claim 1, wherein said guide mechanism comprises a contact element of said second contact means pressed against said second conductor.

3. An electrical connector device according to claim 1, wherein said guide mechanism comprises resilient means for pressing said third insulator against said second insulator.

4. An electrical connector device according to claim 1, further comprising means between said first and third insulators for limiting the relative angular movement thereof within a predetermined angle.

5. An electrical connector device according to claim 4, wherein said limiting means comprises said third conductor having one end secured to said first contact means fixed to said first insulator and the other end secured to said second contact means with the maximum amount of an extension of said third conductor corresponding to said predetermined angle.

6. An electrical connector device according to claim 4, wherein said limiting means comprises a first gear held in engagement with said first insulator, and a second gear operatively connected to said third insulator, said first and second gears being in mesh with each other with a play corresponding to said predetermined angle.

7. An electrical connector device according to claim 1 or 2, wherein two sets of said first and second conductors are provided, said sets each having said first contact means, said second contact means and said third conductor, thereby forming forward and return electrical paths.

8. An electrical connector device according to claim 7, wherein said first and second insulators include first and second casings, respectively, said third insulator comprising a third casing disposed in an inner space defined by said first and second casings, and said second and third casings being rotatable about a single axis of rotation.

9. An electrical connector device according to claim 8, wherein said third conductors providing said forward and return electrical paths are disposed in an inner space defined by said first and third casings and coiled in opposite directions about said axis of rotation, said third conductors having one ends secured to said first contact means fixed to said first casing and the other ends secured to said second contact means fixed to said third casing.

10. An electrical connector device according to claim 3, 4, or 8, wherein said connection between said second conductor and said second contact means is provided by a slip ring mechanism.

11. An electrical connector device according to claim 10, wherein said slip ring mechanism comprises a fin-shaped slip ring embedded in said second casing, and a resilient contact terminal fixed to said third casing and gripping a vertical central portion of said slip ring.

12. An electrical connector device according to claim 9, wherein said third conductors have equal maximum amounts of extension thereof in said forward and return electrical paths, for bringing back said third casing to its proper position with respect to said first casing.

13. An electrical connector device according to claim 7, wherein said third casing is capable of returning to its proper position through meshing engagement between said first and second gears.

14. An electrical connector device comprising a rotatable casing, a fixed casing, said rotatable and fixed casings jointly defining a space, an intermediate casing disposed in said space, an electrical conductor coiled between said intermediate and fixed casings, said intermediate casing being rotatable relative to said rotatable and fixed casings, and a slip ring mechanism by which said intermediate and rotatable casings are pressed against each other for corotation.

15. An electrical connector device comprising an upper rotatable casing, a lower fixed casing, said upper rotatable and lower fixed casings jointly defining a space, an intermediate casing disposed in said space, an electrical conductor coiled in a space defined between said intermediate and fixed casings, said intermediate casing being rotatable relative to said upper and lower casings, resilient means urging said intermediate casing against said upper casing for corotation, a slip ring mechanism disposed between said intermediate and upper casings, and a rotation locking mechanism disposed between said intermediate and lower casing for locking said intermediate casing from against angular movement.

16. An electrical connector device according to claim 15, wherein said slip ring mechanism comprises a fin-shaped slip ring embedded peripherally fully around one of said upper and lower casings, and a resilient contact terminal fixed to the other of said upper and lower casings and gripping said slip ring at a vertically central portion thereof.

17. An electrical connector device according to claim 15, wherein said rotation locking mechanism comprises a large-diameter gear loosely fitted over a cylindrical wall of said upper casing and axially fitted over said intermediate casing through splines, and a small-diameter gear held in mesh with said large-diameter gear and rotatably mounted on said lower casing, said small-diameter gear having teeth defined by combining two adjacent teeth, said large-diameter gear having a plurality of gear grooves allowing meshing engagement with said teeth of said small-diameter gear and positioned in predetermined locations such that said intermediate casing will be locked against rotation after the same has been rotated with respect to said lower casing through a predetermined number of revolutions in either direction.

* * * * *